United States Patent
Sastri

(10) Patent No.: US 10,673,811 B2
(45) Date of Patent: Jun. 2, 2020

(54) UPDATING ADDRESS MAPPING FOR LOCAL AND NETWORK RESOURCES

(71) Applicant: ColorTokens, Inc., Santa Clara, CA (US)

(72) Inventor: Bharat Sastri, Pleasanton, CA (US)

(73) Assignee: COLORTOKENS, INC. CA (US)

( * ) Notice: Subject to any disclaimer, the term of this patent is extended or adjusted under 35 U.S.C. 154(b) by 0 days.

(21) Appl. No.: 15/657,418

(22) Filed: Jul. 24, 2017

(65) Prior Publication Data
US 2018/0026940 A1 Jan. 25, 2018

Related U.S. Application Data

(60) Provisional application No. 62/366,339, filed on Jul. 25, 2016.

(51) Int. Cl.
| | | |
|---|---|---|
| *G06F 12/00* | (2006.01) | |
| *H04L 29/12* | (2006.01) | |
| *H04L 12/24* | (2006.01) | |
| *H04L 29/06* | (2006.01) | |
| *H04W 12/06* | (2009.01) | |

(52) U.S. Cl.
CPC ...... *H04L 61/2514* (2013.01); *H04L 41/0813* (2013.01); *H04L 61/2521* (2013.01); *H04L 63/06* (2013.01); *H04L 63/08* (2013.01); *G06F 12/00* (2013.01); *H04L 63/168* (2013.01); *H04W 12/06* (2013.01)

(58) Field of Classification Search
CPC .................................................. G06F 12/00
USPC ....................................................... 711/202
See application file for complete search history.

(56) References Cited

U.S. PATENT DOCUMENTS

| | | | | |
|---|---|---|---|---|
| 8,626,876 B1* | 1/2014 | Kokal | ..................... | H04L 67/06 709/203 |
| 2006/0271752 A1* | 11/2006 | Cowan | ................ | G06F 12/1475 711/163 |
| 2009/0199177 A1* | 8/2009 | Edwards | ............... | G06F 9/5077 718/1 |
| 2014/0032940 A1* | 1/2014 | Sartirana | ............... | G06F 16/183 713/300 |
| 2015/0032940 A1* | 1/2015 | Karamcheti | .......... | G06F 1/3209 711/103 |
| 2015/0249573 A1* | 9/2015 | Miller | ................. | H04L 41/0816 709/221 |

* cited by examiner

*Primary Examiner* — Gautam Sain
(74) *Attorney, Agent, or Firm* — Barry Choobin; Patent 360 LLC

(57) ABSTRACT

Techniques to facilitate enhanced addressing of local and network resources from a computing system are provided herein. In one implementation, a method of updating a virtual address mapping for an application on a computing system includes identifying a request to update the address mapping from a first mapping to a second mapping, wherein the first mapping maps virtual addresses to local addresses for local resources. The method further includes identifying at least one configuration resource to support the update, and retrieving an update configuration from the at least one configuration resource. Based on the update configuration, the method provides generating the second mapping, wherein the second mapping maps the virtual addresses to second local addresses for the second local resources and network addresses that address network resources accessible over a network.

8 Claims, 8 Drawing Sheets

UPDATING ADDRESS MAPPING FOR LOCAL AND NETWORK RESOURCES

RELATED APPLICATIONS

This application claims the benefit of, and priority to, U.S. Provisional Patent Application No. 62/366,339, entitled "UPDATING ADDRESS MAPPING FOR LOCAL AND NETWORK RESOURCES", filed Jul. 25, 2016, which is hereby incorporated by reference in its entirety for all purposes.

TECHNICAL FIELD

Aspects of the disclosure are related to computing hardware and software technology, and in particular to computer architecture, cloud computing, and virtualization technology.

TECHNICAL BACKGROUND

Today, computing is increasingly being delivered as a utility service over the Internet. Through the deployment of cloud computing and virtualization technology, compute, storage, and application services are available for on-demand consumption over the Internet. In this model of delivery, a user is not required to have knowledge of the physical locations and the configurations of the compute and storage resources in order to utilize the service. For example, additional storage may be provided to a user computing device without the user having knowledge of the physical location of the storage on a communication network.

Although the utility as a service has provided increased resources to end users, wherein users may connect to any number of devices and provide operations with respect to the devices, it often remains difficult to manage the various resources that are being provided to each device computing system. In particular, administrators may be forced to provide manual assignment of the various resources, which can be cumbersome in situations where users use a variety hardware and software configurations.

In addition to the difficulties described above in determining what resources are provided to what systems and devices, difficulties also arise when updates or enhanced feature sets are required for applications on the computing systems. These updates typically require the system to download data for the update, and install the data locally on storage resources. However, these updates may be inefficient, as large data updates may be required to provide additional functionality for the computing system.

OVERVIEW

Provided herein are systems, methods, and software to enhance addressing of local and network resources for a computing system. In one implementation, a method of updating a virtual address mapping for an application includes identifying a request to update the virtual address mapping from a first mapping to a second mapping, wherein the first mapping maps virtual addresses for the application to first local addresses that address local resources of the computing system. The method further provides identifying at least one configuration resource to update the virtual address mapping, transfer a request to the configuration resource to update the virtual address mapping, and receive a configuration for the virtual address mapping for the application. The method also includes, based on the configuration, generating the second mapping, wherein the second mapping maps the virtual addresses for the application to second local addresses that address the local resources of the computing system and network addresses that address network resources external to the computing system over at least a network.

In some implementations, the network addresses comprise Uniform Resource Identifiers (URIs).

In some implementations, the local resources comprise disk storage and dynamic random-access memory (DRAM).

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
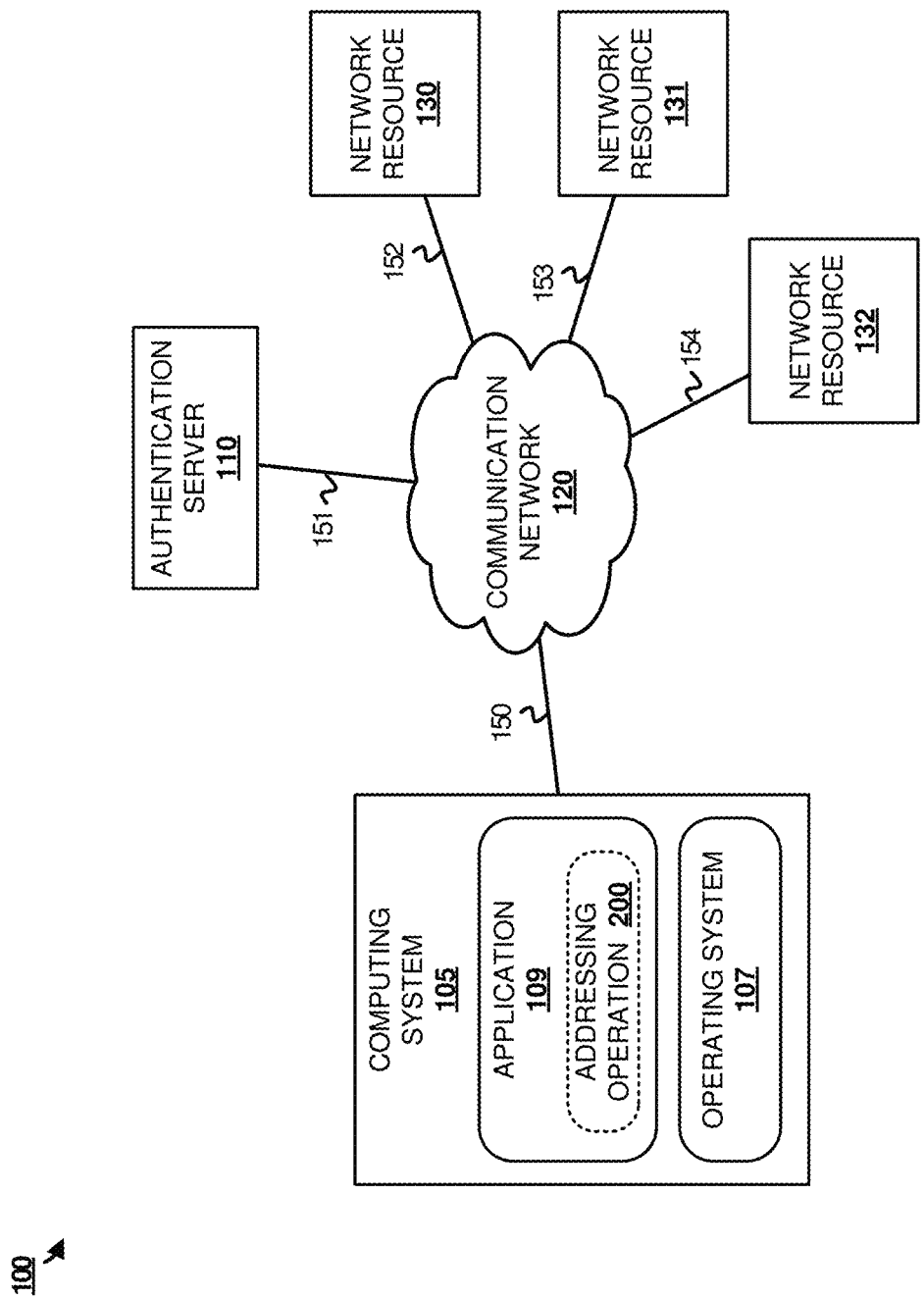
FIG. 1 illustrates a communication network for generating a virtual address mapping according to one implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The following discussion presents techniques to federate or unify a plurality of physical and virtual compute, storage, and Internet resources and make them available as a local resource in an application of a computing system. The techniques provide on-demand deployment and presentation of a compute resource that incorporates discrete physical and virtual compute, storage, and Internet resources available both locally and in the cloud as a unified local compute resource to a user.

In some examples, a computing system may be configured with a plurality of applications that provide various functions, including email, web browsing, file sharing, or any other similar application. These applications are provided with a virtual addressing space that permits the addresses to request and store data to storage locations without identifying the physical location of the resource. For example, to retrieve a page, an application may request data from a particular virtual address. In response to the request, the virtual address may be translated into a physical address, and the appropriate data may be accessed from the physical addresses.

Here, instead of translating virtual addresses to only local physical addresses, such as addresses that can address local storage disk, solid state drives, and dynamic random access memory (DRAM), the virtual addresses may also be translated into network addresses, such as uniform resource identifiers (URIs) capable of accessing data over a network. In particular, when a virtual address is mapped to a network address, the computing system may translate the virtual address to the appropriate network address and access the required data, which may comprise a page of data using the URI or some other data resource accessible via a URI. In some implementations, this accessing of the data may include translating a request using the virtual address into a Hypertext Transfer Protocol Secure (HTTPS) command or HTTP command that include GET, PUT, POST, and DELETE operations with respect to the desired resource. Once the data is accessed, any data may be provided to the application as if the data were stored on a local resource. Consequently, even if a network address is used to retrieve a page of data, the user of the computing system may access and process the data on the device as if it is stored on a local resource.

In some examples, it may be desirable for a user of a computing system to update the virtual address mapping that is used for an application on a computing device. As a result, credentials may be identified for the application and configuration resources may be used to update the virtual address mapping of the application in conjunction with the provided credentials. For example, a user may provide credentials to add resources to an application, permitting the application to access resources external to the computing system over a network and process the resources as if the resources were local to the computing system.

Referring now to FIG. 1, FIG. 1 illustrates a communication network 100 for generating a virtual address mapping according to one implementation. Communication network 100 includes computing system 105, authentication server 110, communication network 120, and network resources 130-132. Authentication server 110 and network resources 130-132 may each comprise physical host computing systems, virtual machines, containers, or some combination thereof. Network resources 130-132 are examples of resources capable of providing configuration information for addressing on computing system 105. Computing system 105, authentication server 110, and network resources 130-132 communicate with communication network 120 via communication links 150-154.

In operation, application 109, which includes addressing operation 200, executes on computing system 105 with operating system 107. Operating system 107 may represent a desktop operating system such as Microsoft Windows, Apple OSX, Linux, or some other similar desktop operating system, or may represent a mobile operating system, such as Google's Android, Apple iOS, or some other similar mobile operating system. To provide the desired functionality for the end user of computing system 105, addressing operation 200 is used to configure the addressing space for the application 109. In particular, addressing operation 200 is used to identify credentials for the user of computing system 105, request addressing configuration information based on the credentials, and generate a mapping between virtual addresses for computing system 105 to local addresses and network addresses.

In some examples, in identifying the credentials, the credentials may be used to update the address mapping for the application. For example, application 109 may be provided with a first addressing configuration for use by the addressing operation. During the execution of the application, credentials may be identified for computing system 105, and the addressing for the application may be updated based on the credentials. In particular, the first addressing may provide first mapping of virtual addresses to first local addresses and, in some examples, first network addresses. In response to identifying the credentials, a second addressing may be generated that provides second mapping of the virtual addresses to second local addresses and, in some examples, second network addresses. In some examples, the second local addresses and second network addresses may include at least a portion of the addresses from the first local addresses and second network addresses. However, it should be understood that the second local addresses and second network addresses may be distinct from the first local and network addresses.

Figure 2:
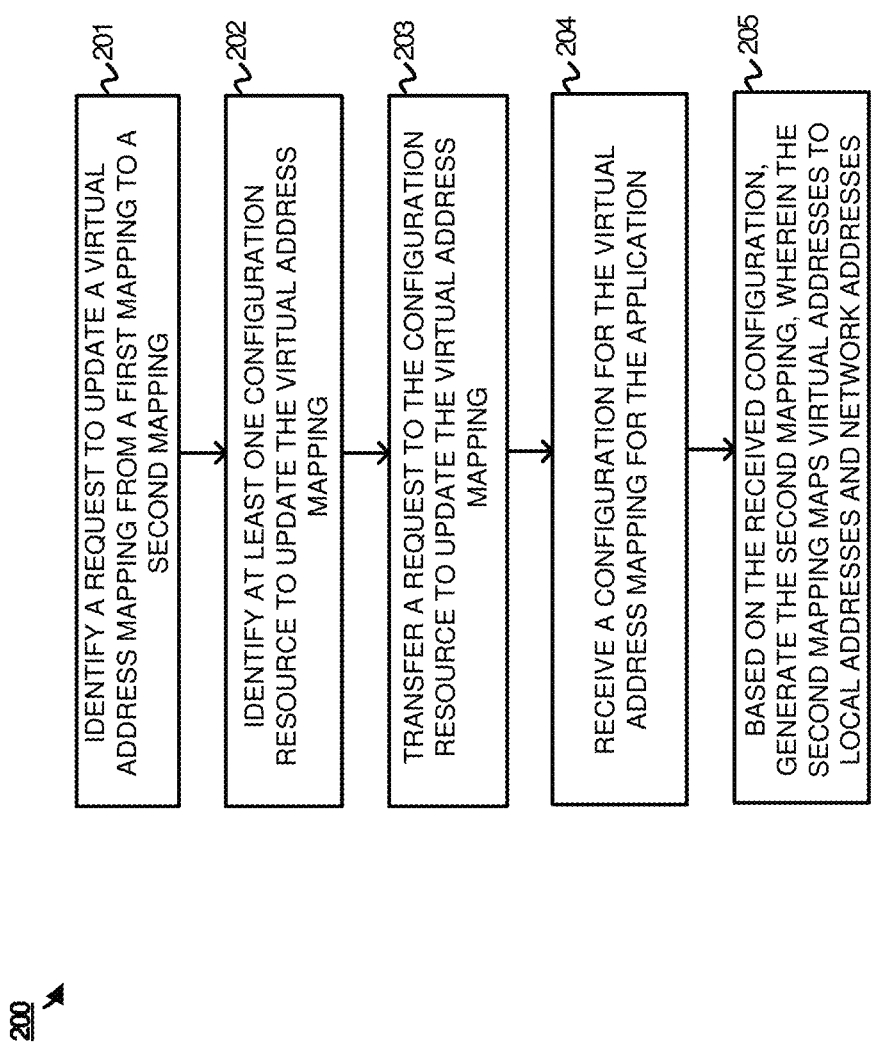
FIG. 2 illustrates an operation of generating a virtual address mapping according to one implementation.

To further demonstrate the configuration of computing system 105, FIG. 2 is provided. FIG. 2 illustrates an operation 200 of generating a virtual address mapping according to one implementation. The processes of operation 200 are referenced parenthetically in the paragraphs that follow, along with references to the elements and systems from communication system 100 of FIG. 1.

As depicted, operation 200 includes identifying a request to update virtual address space from a first mapping to a second mapping (201). In response to the request, the operation identifies at least one configuration resource to update the virtual address mapping (202), and transfers a request to the configuration resource to update the virtual address mapping (203). In some implementations, a user interface on computing system 105 may be used to receive credentials from the user including, but not limited to, usernames, passwords, verification codes, or some other similar credentials. Once the credentials are received, the credentials may be supplied to authentication server 110, wherein authentication server 110 may provide access information to computing system 105 to update the addressing for application 109. In other implementations, configuration resource access information may be stored locally on computing system 105, permitting the configuration resource to be addressed without querying the authentication server. This local access information may be used to update the application to a newer version in some examples.

Once the configuration resource receives the request from computing system 105, the configuration resource may provide configuration information to computing system 105 to update the addressing for application 109. For example, if the configuration information to support the update request were network resource 130, a request may be transferred to network resource 130 over communication network 120, wherein the request may use internet protocol (IP) address information for the network resource, URI information for the network resource, credentials for the network resource, or any other similar information to transfer the request. Once received, the network resource may verify that the credentials are approved to receive the addressing configuration and transfer the configuration to computing system 105. Operation 200 directs computing system 105 to receive the configuration for the virtual address mapping for application 109 (204) and, based on the received configuration, generate the second mapping, wherein the second mapping maps the virtual addresses to local addresses and network addresses, and wherein at least a portion of the local addresses and the network addresses are newly mapped based on the configuration.

As an illustrative example, application 109 may be configured with a first addressing configuration with virtual addresses mapped to local storage resources. During the operation of the application, or prior to execution of the application, the user of computing system 105 may specify that it requires additional resources (such as storage resources or processing functions). In response to the specification by the user, computing system 105 will identify configuration resources and retrieve a second addressing configuration for application 109. This new configuration may permit the application to use addressing from the first configuration, i.e. local resources, as well as additional addressing, permitting application 109 to use resources over at least communication network 120. This allows virtual addresses that are associated with network addresses to access the required data over the network as if the data were local to the computing system.

Although described in the previous example as providing credentials from the end user, it should be understood that other credentials may also be used in authorizing the application to receive additional resources. For example, the device may include a media access control (MAC) address or some other similar identifier that can be used at least partially for the credentials in updating the application addressing.

Figure 3:
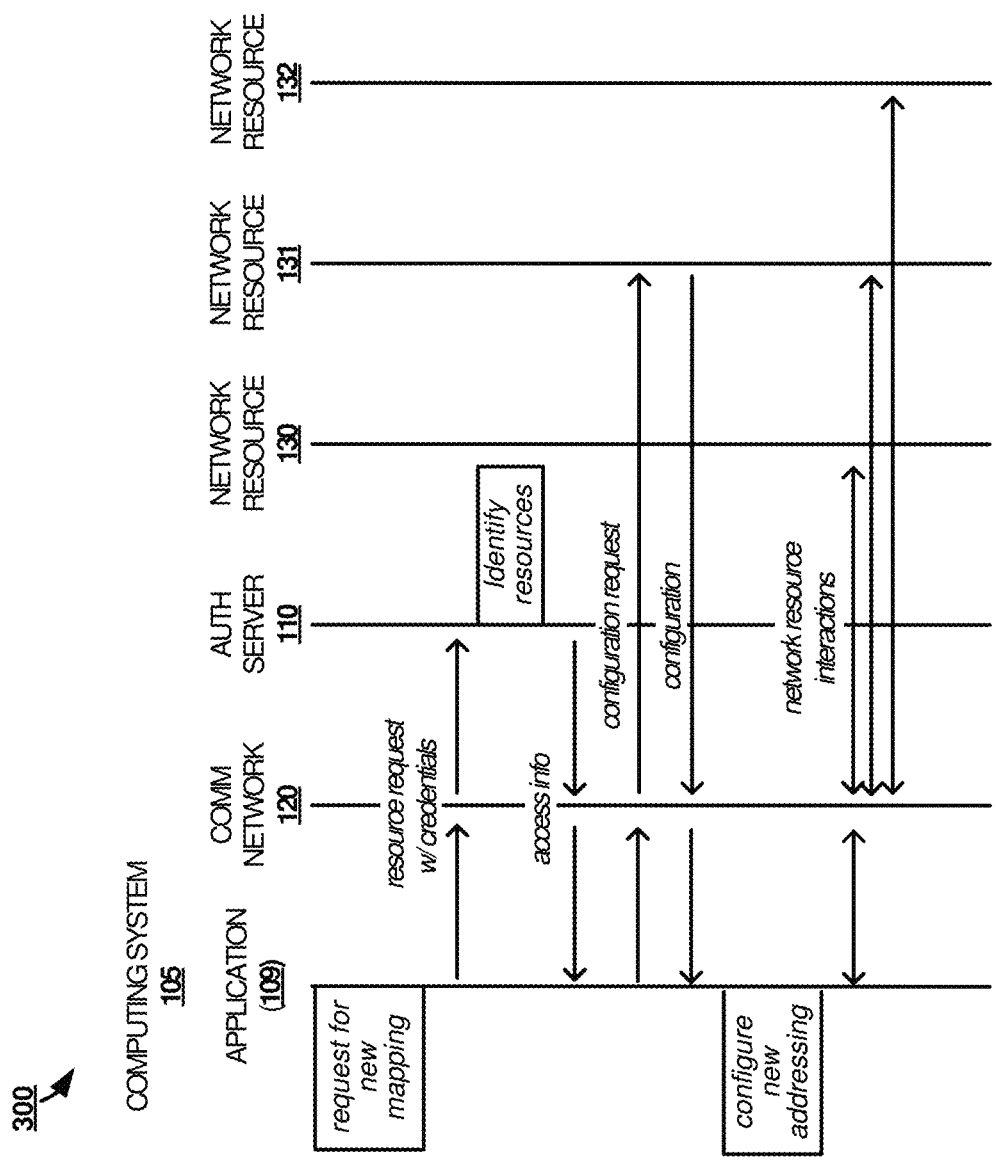
FIG. 3 illustrates an operational scenario of generating a new virtual address mapping according to one implementation.

FIG. 3 illustrates a timing diagram 300 of generating a virtual address mapping for an application according to one implementation. Timing diagram 300 is described in the paragraphs that follow with references to the elements and systems from communication system 100 of FIG. 1.

As illustrated in FIG. 3, application 109 on computing system 105 identifies a request to change a virtual address mapping for application 109 from a first mapping to a second mapping. The first mapping is used to map virtual addresses to first local addresses and, in some examples, network addresses. In response to the request, computing system 105 to transfers the credentials with a resource request to authentication server 110 over communication network 120. In response to receiving the request, authentication server 110 determines resources for the computing system 105 based on the credentials, and transfers access information for the resources to application 109 on computing system 105. Here, the access information includes information for application 109 to communicate with network resource 131 to update the mapping configuration for application 109, wherein the access information may include addressing information for network resource 131, credentials for network resource 131, or any other required information to retrieve a mapping configuration from network resource 131.

After the access information is received by application 109, application 109 transfers a configuration request to network resource 131 and receives a mapping configuration from the network resource. This mapping configuration is used to generate a second mapping of virtual addresses for the application to local addresses that address local resources and network addresses that address network resources over communication network 120.

In the present example, the mapping configuration is used to update first mapping configuration. Thus, the second mapping may include local and network addresses from the first mapping, and may further include additional local and network addresses for the second mapping. These additional addresses may be used to provide additional storage resources, additional features in the application, or some other additional resource for application 109. For example, the configuration received from network resource 131 may provide additional filters for an image editing application which can be accessed using network resource requests.

Once the mapping is generated based on the configuration information from network resource 131, application 109 executes using the second virtual address mapping. As depicted in timing diagram 300, once the mapping is configured for the application, the mapping may be used to interact with and retrieve required data from network resources 130-132. This data may include program instructions, data objects, such as images, videos, text files, and the like, or some other similar data.

In some implementations, in addition to retrieving the configuration to map the virtual addresses to new local and network addresses, application 109 may also retrieve data to be locally stored on computing system 105. This data may include program instructions and other similar data objects for the operation of application 109 on computing system 105. For example, if the user supplied credentials to receive additional images to be used in conjunction with application 109, images that are most frequently used may be downloaded to the device and stored within local storage resources on computing system 105. The second addressing may then reflect the new downloaded content such that the virtual addressing maps to local addresses for the downloaded content. Additionally, any image or other data associated with the user request may be stored remotely such as in network resources 130-132, and supplied to the computing system based on a request with a virtual address.

Figure 4A:
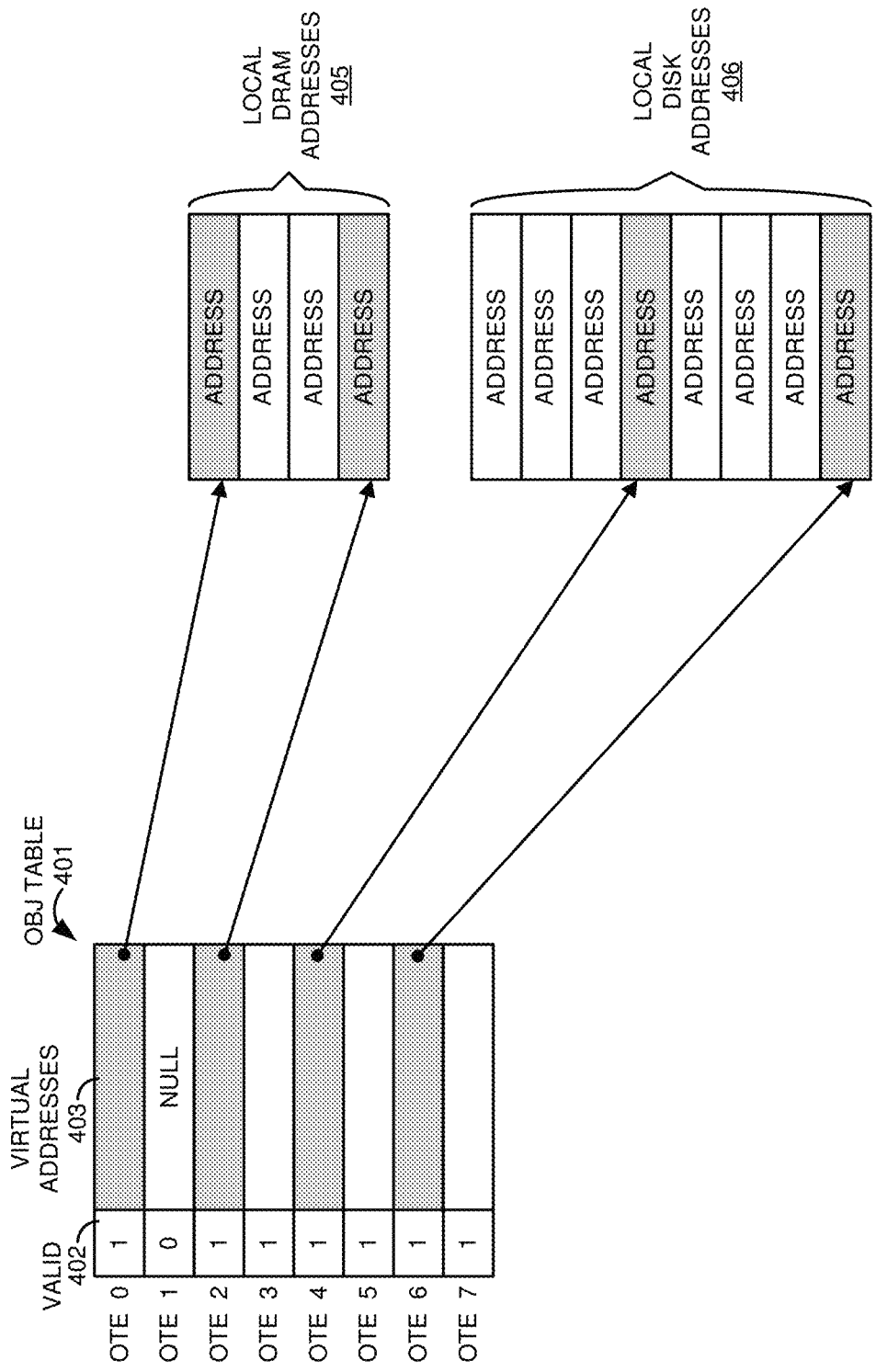
FIGS. 4A and 4B illustrate an overview of modifying a virtual address mapping according to one implementation.
Figure 4B:
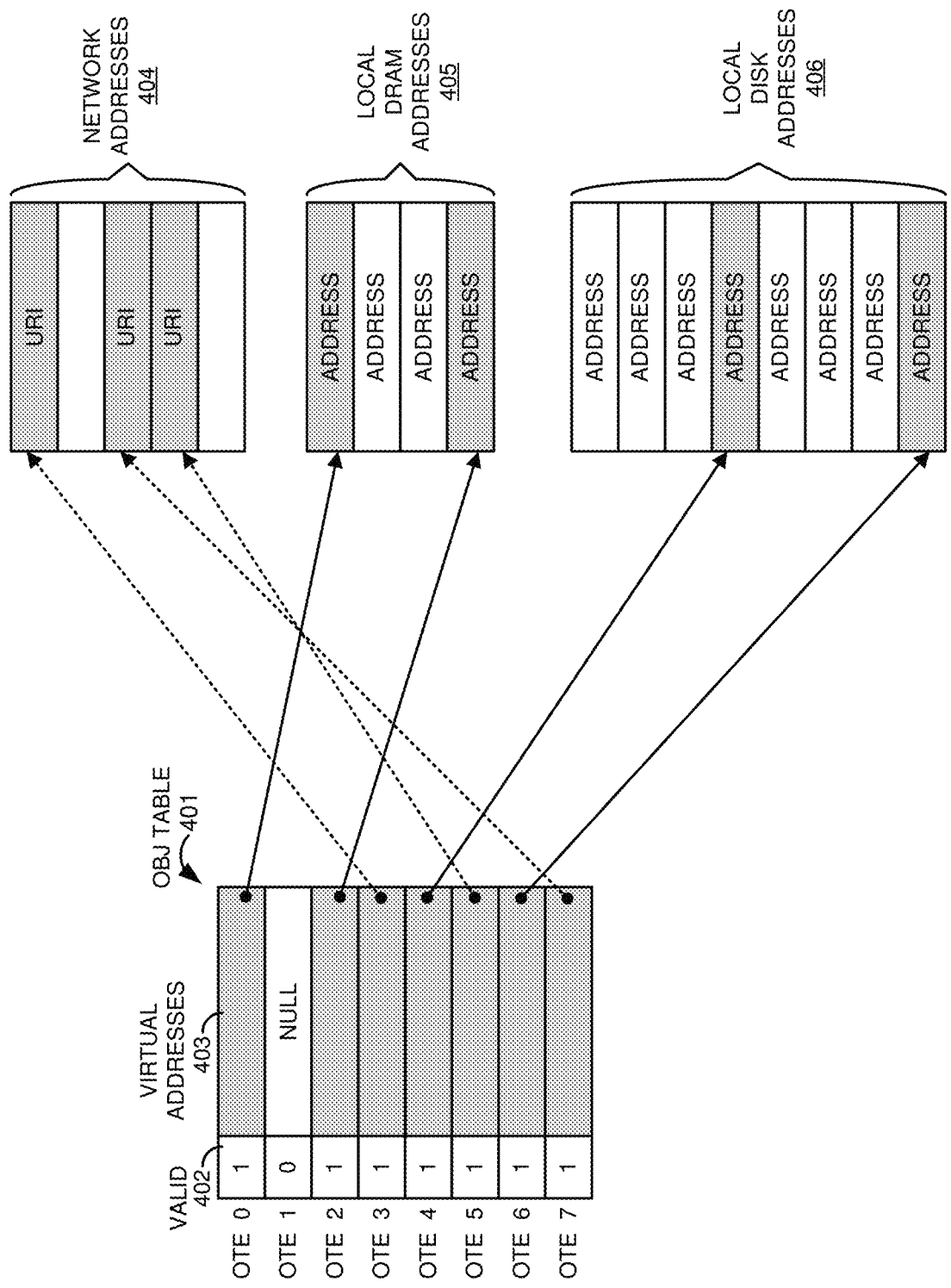

FIGS. 4A and 4B illustrate an overview of modifying a virtual address mapping according to one implementation. FIGS. 4A and 4B include object table 401, which is used to map virtual addresses 403 to network addresses 404 (only illustrated in FIG. 4B), local DRAM addresses 405, and local disk addresses 406. Object table 401 further includes a validity bit 402 for each of the addresses within the table, and object table entry (OTE) values 1-7.

As described herein, an application may include an initial virtual address mapping that is used to map virtual addresses to at least local addresses and, in some examples, network addresses. In particular, virtual addressing, as described herein, permits an application to use a virtual address space to address both local resources and network resources in a similar manner. For example, a computing system may use a 64-bit or a 32-bit virtual addressing scheme that can be translated into the required local address or network address to support a data request.

Referring first to FIG. 4A, FIG. 4A is representative of an initial virtual addressing configuration for an application. In particular, FIG. 4A includes virtual addresses 403 which are mapped to local addresses 405-406. The data at these local addresses may include program instructions, data objects, such as documents, images, videos, or other similar data objects, or some other data. In some implementations, the data at each of the addresses may include data pages, which can be retrieved and processed by a processing system for the computing system.

Although the first configuration represented in FIG. 4A may provide application functionality for the user of the computing system, in some implementations, it may be desirable to update the addressing for the application to provide additional functionality and/or remove any issues with the application. Accordingly, the computing system may identify a request to update the addressing, identify configuration resources for the addressing, retrieve a configuration from the configuration resource, and implement the configuration on the computing system for the application. In particular, the configuration may be used to add additional resources for the application, replace resources for the application, or provide any other modification to the application.

Referring to FIG. 4B, which is representative of addressing following the configuration update, FIG. 4B further maps virtual addresses 403 with network addresses 404. These network addresses may provide additional data and/or processing instruction resources to the application without requiring the resources to be stored locally on the computing system. Consequently, when a request is received that corresponds to a network address, such as a request with OTE 3, then object table 401 may be used to translate the request to the desired network address in network addresses 404, and access the data in accordance with the request. In contrast, if the request included a request to access data stored locally on the computing system, such as OTE 4, then object table 401 may be used to translate the request into the local disk address of local disk addresses 406, and access the data in accordance with the request.

In some examples, in accessing data that is not stored locally in DRAM, the computing system may be configured to cache the data in DRAM. Accordingly, using the example of retrieving data from network addresses 404, the computing system may cache the data in local DRAM addresses for future operations. Thus, it may not be required to consistently access the data at the network address over the network. However, in other implementations, rather than caching the data locally, in some implementations, the data may be required to be retrieved from the network address for each data interaction.

In some implementations, to retrieve data from URIs in network addresses 404, the addressing operation may be configured to use Hypertext Transfer Protocol Secure (HTTPS) commands or HTTP commands (once a secure connection is established with the configuration resource) to access the required data. These commands may include, but are not limited to, GET, PUT, POST, and DELETE to provide the appropriate operation with respect to the application. For example, referring to the URI mapped to OTE 3 of object table 401. When a request is generated to retrieve data at the virtual address associated with OTE 3, object table 401 is used to translate the request to the appropriate URI, and the addressing operation translates the retrieval request into a HTTPS GET request to retrieve the data at the particular URI.

Although illustrated in the example of FIG. 4 as using object table 401 to match virtual addresses 404 to their corresponding network and local addresses, it should be understood that the object tables used by a addressing operation may maintain other information related to accessing the data. This other information may include credentials and security keys to access data at each of the addresses. Consequently, if a request were identified for the virtual address associated with OTE 5, then the addressing operation may use an object table to translate the request to the appropriate URI in network addresses 404 and may further identify the required credentials to access the data. For example, a security token or key may be required when a request is generated for the particular network resource. If the improper key is provided, then the network resource at the URI may prevent any data from being retrieved. However, if the computing system provides the proper access credentials or key, then the network resource may provide the data at the URI. Additionally, credentials and/or keys may be associated with at least a portion of virtual addresses 403, which can be used to encrypt/decrypt any data that is retrieved and sent to a URI. This permits any of the data for the application to be encrypted as it is transferred over a communication network.

In some implementations, in configuring the object tables with the credentials, tokens, and encryption keys to access the various resources, the information may be provided with the addressing configuration data from the configuration resources. In particular, with the access information provided by the authentication server, the application may retrieve the addressing configuration from the network resource using the access information, and may further retrieve the credentials, tokens, encryption keys, and the like. Once retrieved, the mapping may be generated that associates virtual addresses to local and network addresses, and further maps virtual addresses to the required credentials, tokens, and the like.

Figure 5:
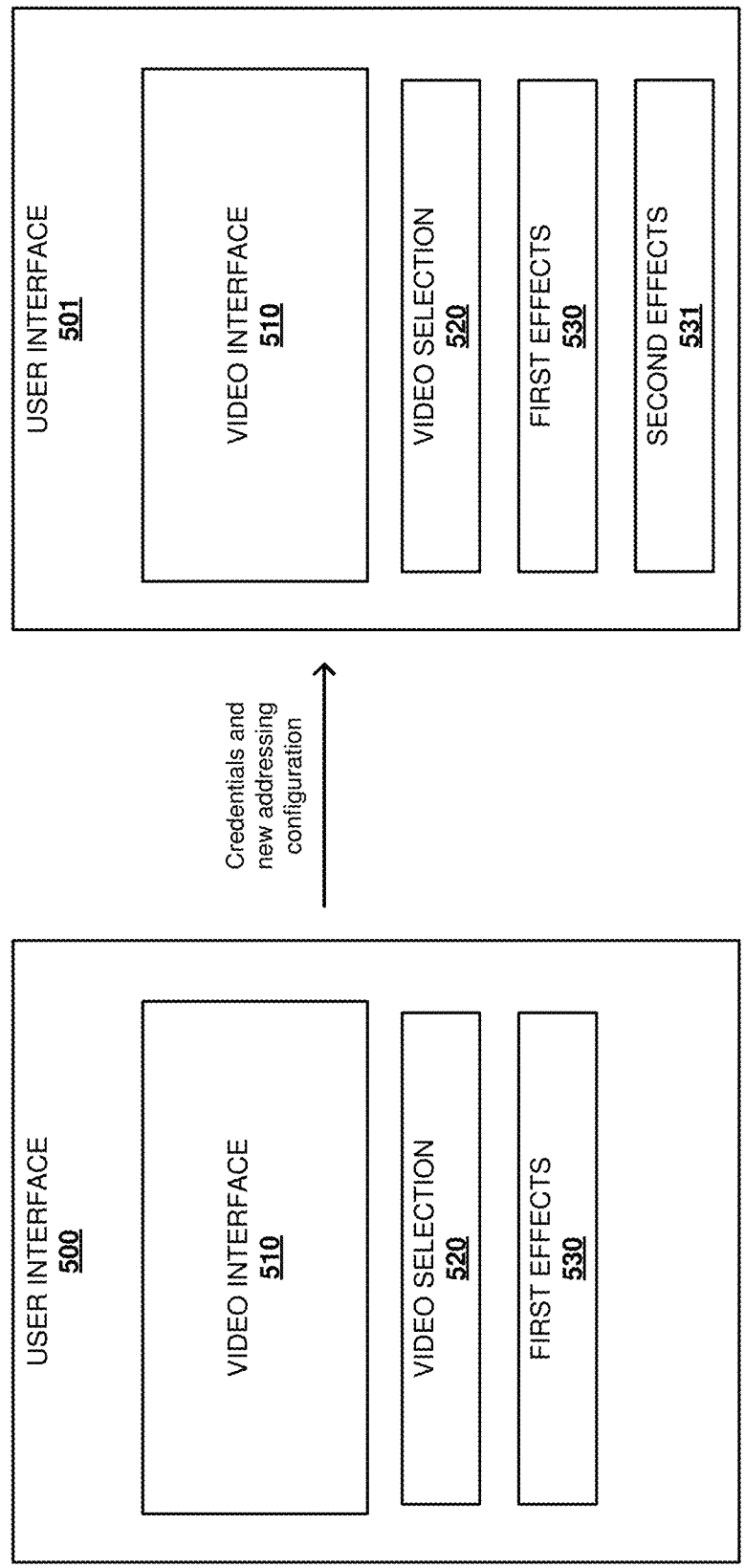
FIG. 5 illustrates modifying an application interface on a computing system according to one implementation.

FIG. 5 illustrates modifying an application interface on a computing system according to one implementation. FIG. 5 includes user interfaces 500 and 501, wherein the user interfaces further include video interface 510, video selection 520, first effects 530, and second effects 531. FIG. 5 is an example of a video editing application, although it should be understood that similar operations may be applied to other applications, such as productivity applications, image editing applications, social media applications, games, and any other similar application on a computing system.

As illustrated in FIG. 5, a user may be provided with a first user interface 500 that provides the user with a video interface 510, video selection 520, and first effects 530. To provide these operations on interface 500, a computing system may maintain an initial virtual address mapping, which is used to map virtual addresses to local addresses and, in some examples, network addresses. For example, the video editing application may be allocated with a range of addresses in a 64-bit virtual addressing space, wherein the virtual addresses are mapped to resources to provide the functionality of the application. Accordingly, even if the application used virtual addresses mapped to both local and network addresses, the virtual addressing space may be used to permit the application to access both the local and network resources in the same manner.

In some implementations, it may be desirable to update and/or upgrade an application to provide additional functionality and/or provide fixes to current functionality. To provide the update to the application, the computing system identifies a request to update the address mapping for the application and identifies a configuration resource for the address mapping. Once identified, the computing system may retrieve a configuration for the application address mapping, and implement the configuration to generate a second mapping. In many implementations, the second mapping may include at least a portion of the initial mapping for the application. For example, the initial address mapping may map to only local resources, such as DRAM and local disk storage, whereas the second address mapping may map to at least a portion of the same local resources with the addition of mapping to network resources. Thus, without downloading and storing new data to the computing system, the addressing for the application may be updates such that the newly required data may be accessed over the network.

Here, as depicted in user interface 501, in response to a request to update the application and receiving a new configuration, the application includes second effects 531 in addition to the other elements that were provided in user interface 500. These second effects may be provided based on credentials or request of the user, based on an application update requirement for the application, or based on any other similar request. For example, the application may provide the user of the computing system with the ability to upgrade or provide additional functionality. The user may then provide credentials or accept the additional functionality initiating the process of identifying the configuration resources, retrieving the configuration from the configuration resources, and implementing the configuration to provide the desired address mapping for the application. Thus, in some examples, the credentials provided by the user for the application may be used to provide extensions to the application's functionality.

Although described in the previous example as only downloading a mapping configuration from the configuration resources, it should be understood that data may also be download from the configuration resources. For example, rather than requiring additional data corresponding the update to be addressable over the network, at least a portion of the data may be stored in local resources for the computing system. This data may include data to be most frequently accessed by the computing system or any other portion of new data associated with the updated mapping request.

Figure 6:
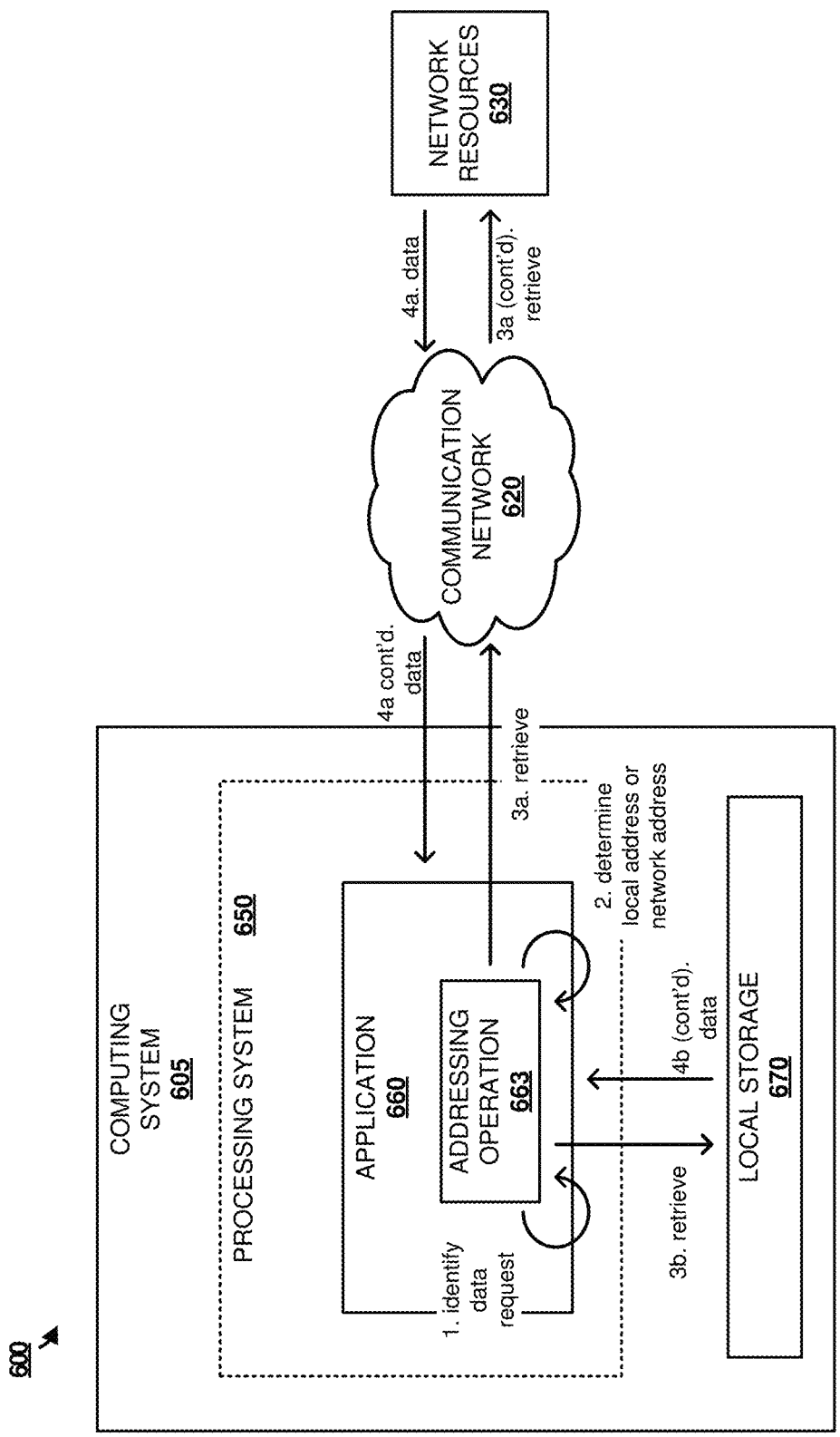
FIG. 6 illustrates an operational scenario of accessing local and network resources according to one implementation.

FIG. 6 illustrates an operational scenario 600 of accessing local and network addresses according to one implementation. Operational scenario 600 includes computing system 605, communication network 620, and network resources 630. Computing system 605 includes processing system 650 configured operate application 660 with addressing operation 663, and further includes local storage 670. The operations described in FIG. 6 are representative of data interactions that may occur with a first mapping configuration or a second mapping configuration generated as an update to the first mapping configuration.

In the present example of operational scenario 600, addressing operation 663 for application 660 has been configured with an address mapping as described herein. This address mapping, which can be provided from a configuration network resource in some examples, permits the application to access and store data locally using the same addressing space as data that is stored on network resources accessible over network 620. For example, the virtual addressing space may comprise a 64-bit addressing space that can be translated into local addresses to address data that is stored on local storage 670, as well as network addresses to address data that are capable of addressing resources (such as data pages) located on resources over communication network 620.

Here, at step 1, addressing operation 663, which is executing as part of application 660, identifies a data request for application 660. In response to identifying the request, addressing operation 663, at step 2, determines a local address or a network address for the request based on the configured mapping for addressing operation 663. In particular, addressing operation 663 may maintain one or more tables, arrays, or other data structures to translate requests with virtual addresses to local or network addresses.

In the first example, for a network retrieval represented by steps with the letter "a," addressing operation 663 identifies that the request is directed at a network address, such as a URI. In response to this identification, at step 3a, addressing operation 663 initiates a retrieval process over communication network 620 to network resources 630. In response to the request, the resource at the desired URI may identify the required data and provide, at step 4a, the data over communication network 620 to application 660. In some implementations, to access the data, the virtual address may be further associated with various credentials, such as encryption keys, tokens, and the like. As a result, when the retrieval is initiated by addressing operation 663, the operation may provide the token, or exchange security parameters with the network resource to authorize the retrieval of the data. Further, an encryption key may be used decrypt any of the data that is retrieved from the resource.

In the second example, for a local retrieval represented by steps with the letter "b," addressing operation 663 identifies that the request is directed at a local address for local storage 670. In response to the identification, at step 3b, addressing operation 663 initiates a retrieval process to retrieve the data from local storage 670, wherein the data is provided to application 660, at step 4b. This local storage 670 may comprise DRAM, solid state storage, disk storage, or some other similar storage that is not accessible over communication network 620.

In some implementations, local storage 670 may also be used to cache data from network resources 630. For example, if a data request required a data page from network resources, the page may be retrieved and cached locally in local storage 670, permitting local access to the data. Although illustrated in the example of operational scenario 600 with retrieving data from local storage 670 and network resources 630, it should be understood that similar operations may be applied to writing, copying, deleting, or any other similar access operation with respect to the data.

While not described in the example of FIG. 6, it should be understood that the mapping of virtual addresses may be updated as described herein. In particular, a first mapping may be updated to a second mapping in response to an end user request, in response to a requirement for the application to be updated, or for some other update request. In response to the request, a network resource may be identified to supply the updated mapping configuration information, and the mapping may be updated for the application based on the received information from the network resource.

Although illustrated in the examples of FIGS. 1-6 as the addressing operation being located within the application, it should be understood that that operation may execute at least partially with the operating system or some other application on the computing system. For example, when a user requests an update to the virtual address mapping for the application, a software module in the operating system may be used to request the required configuration information and update the address mapping as required by the request.

Figure 7:
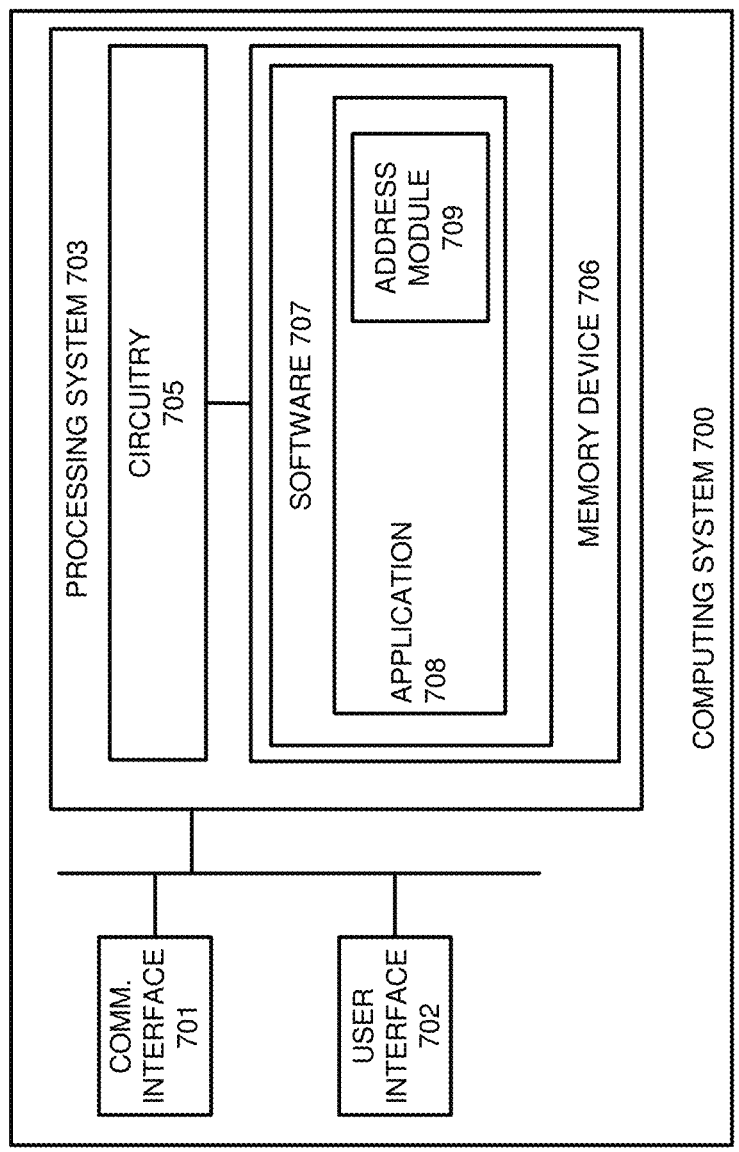
FIG. 7 illustrates a computing system to update addressing for an application according to one implementation.

FIG. 7 illustrates a computing system 700 to update addressing for an application according to one implementation. Computing system 700 is representative of any computing system or systems with which the various operational architectures, processes, scenarios, and sequences disclosed herein for updating application addressing may be implemented. Computing system 700 is an example of computing system 105 and 605, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a user device, subscriber equipment, customer equipment, access terminal, smartphone, personal digital assistant (PDA), computer, tablet computing device, e-book, Internet appliance, media player, game console, or some other user communication apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to communicate with network resources that can be used to configure and provide data resources for an application executing on computing system 700. Further, communication interface 701 may be configured to provide communications with an authentication server capable of checking credentials for a user and/or the computing system, and providing access information for configuration resources.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises a microprocessor that retrieves and executes operating software 707 from memory device 706. Memory device 706 is a non-transitory storage medium configured to facilitate storage of information, such as computer readable instructions, data structures, and program modules. Memory device 706 may be implemented as a single storage device, but may also be implemented across multiple, interconnected storage devices or subsystems. Examples of storage media include random access memory, read only memory, magnetic disks, optical disks, and flash memory, as well as any combinations or variations thereof. It should be understood that in no case is the storage medium a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes application 708 with addressing module 709, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, application 708 may be allocated a first address mapping that is used by the application in accessing required data for operation on computing system 700. This address mapping maps virtual addresses, which may be allocated by the operating system, to local addresses to address local resources of the computing system and, in some examples, network addresses to address network resources over at least a communication network. In particular, the mapping may permit local resources, such as DRAM and local disk storage, to be addressed during the execution of the application in a similar manner as network resources, such as data storage on servers accessible using a URI. For example, if a first data access request included a virtual address associated with a local address, then the virtual address would be translated into the local address and the data would be accessed from the local resource. In contrast, if a second data access request included a virtual address associated with a network address, then the virtual address would be translated into the requisite network address and the data would be accessed from the network resource over a communication network using at least the network address. In some implementations, in translating to the network address, the translation may also use HTTPS commands to provide the required data. For example, if data were to be retrieved a request may be translated to a HTTPS GET command and the required data may be retrieved from the network resource using the network address.

In the present example, application 708 include address module 709, wherein address module 709 is used to update the addressing configuration for application 708. In particular, address module 709 when read and executed by processing system 703 may identify a request to update a virtual address mapping from a first mapping to a second mapping. This request may be generated by a user of computing system 700, may be generated by the application itself, or may be generated by an external source, such as a network configuration resource. In response to the request, address module 709 directs processing system 703 to identifying at least one configuration resource to update the virtual address space for the application, and retrieve a configuration to update the virtual address space via communication interface 701. In some implementations, to identify the configuration resource, address module 709 may direct processing system 703 to receive user input for credentials to modify the address mapping. For example, the user may provide select a new feature, and provide a username and password. Once the credentials are provided, the credentials may be supplied to an authentication server via communication interface 701. The authentication server may verify the credentials and the selected feature, and provide access information for at least one configuration resource to configure the address mapping on computing system 700.

Once the configuration is received from the network configuration resource, address module 709 directs processing system 703 to generate a second mapping of the virtual addresses based on the configuration. In particular, while the first mapping may map to first local addresses and first network addresses, the second mapping will map to second local addresses and second network addresses. These second local and network addresses may include at least a portion of the addresses that were used for the first mapping. For example, returning to the example of the user requesting additional features for the application, the virtual addresses may continue to map to addresses used for existing features while mapping new addresses to any additional features requested by the end user.

In at least one implementation, the first mapping for application 708 may map virtual addresses to first local addresses, whereas the second mapping for application 708 may map virtual addresses to second local address (including at least a portion of the first local addresses), and network addresses that provide additional functionality or fix issues with the application.

Although illustrated within application 708 in the example of FIG. 7, it should be understood that address module 709 may execute at least partially as a second application outside of application 708 or as part of the operating system on computing system 700. For example, in response to a request to update address mapping for application 708, the operating system may execute the processes described herein to provide the updated virtual addressing for application 708. Further, in addition to the configuration information for the addressing supplied from the network configuration resource, it should be understood that additional data may be supplied to and stored on computing system 700 by the configuration resource. This additional data may include processing instructions, videos, images, documents, or any other similual data that may be required for the updated application. As a result, when the new addressing configuration is generated for application 708, virtual addresses may be mapped to local addresses that store the data provided by the configuration resource.

Returning to the elements of FIG. 1, computing system 105 can be a user device, subscriber equipment, customer equipment, access terminal, smartphone, personal digital assistant (PDA), computer, tablet computing device, e-book, Internet appliance, media player, game console, or some other user communication apparatus. Computing system 105 can include communication interfaces, network interfaces, processing systems, computer systems, microprocessors, storage systems, storage media, or some other processing devices or software systems. In some implementations, computing system 105 may represent a virtual machine executing on a host computing system.

Authentication server 110 can include communication interfaces, network interfaces, processing systems, computer systems, microprocessors, storage systems, storage media, or some other processing devices or software systems, and can be distributed among multiple devices. Examples of authentication server 110 can include software such as an operating system, logs, databases, utilities, drivers, natural language processing software, networking software, and other software stored on a computer-readable medium. Authentication server 110 may comprise, in some examples, one or more server computing systems, desktop computing systems, laptop computing systems, or any other computing system, including combinations thereof.

Network resources 130-132 can each include communication interfaces, network interfaces, processing systems, computer systems, microprocessors, storage systems, storage media, or some other processing devices or software systems, and can be distributed among multiple devices. Examples of network resources 130-132 can include software such as an operating system, logs, databases, utilities, drivers, natural language processing software, networking software, and other software stored on a computer-readable medium. Network resources 130-132 may each comprise, in some examples, one or more server computing systems, desktop computing systems, laptop computing systems, or any other computing system, including combinations thereof. Network resources 130-132 may be configured to store addressing configurations for computing systems, and may further be configured to provide resources, such as storage resources (with processing instructions, images, videos, documents, and the like), capable of being addressed by the end computing systems.

Communication network 120 may comprise switches, wireless access nodes, Internet routers, network gateways, application servers, computer systems, communication links, or some other type of communication equipment—including combinations thereof. Communication network is capable of providing communication services to computing system 105, authentication server 110, and network resources 130-132.

Communication links 150-154 each use metal, glass, optical, air, space, or some other material as the transport media. Communication links 150-154 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 150-154 can each be a direct link or can include intermediate networks, systems, or devices, and can include a logical network link transported over multiple physical links. Although one main link for each of links 150-154 is shown in FIG. 1, it should be understood that links 150-154 are merely illustrative to show communication modes or access pathways. In other examples, further links can be shown, with portions of the further links shared and used for different communication sessions or different content types, among other configurations. Communication links 150-154 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

What is claimed is:

1. A computer-implemented method executable on a computer-based device, said computer implemented method comprising the following computer-implemented steps:

generating a first mapping that translates at least one virtual address into a local address assigned to at least one local resource, and rendering said virtual address usable on said computer-based device, based on said first mapping, for accessing said local resource;

in response to a request from said computer-based device for using said virtual address to access an external network resource in addition to accessing said local resource, identifying configuration information for rendering said external network resource accessible on said computer-based device;
processing said configuration information, and determining, based on said configuration information, at least an external network resource address usable for accessing said external network resource; and
generating a second mapping, said second mapping being at least an updating of said first mapping, and configuring said second mapping to translate said virtual address into said external network resource address, wherein the step of generating the second mapping further includes the step of configuring said second mapping to translate said virtual address into said external network resource address, and to simultaneously translate said virtual address into a second local address distinct from said local address, and assigned to a second local resource, and wherein the step of configuring said second mapping further includes the step of selectively reconfiguring said second mapping to translate said virtual address into a second external network resource address distinct from said external network resource address, and to simultaneously translate said virtual address into said second local address assigned to said second local resource.

2. The method as claimed in claim 1, wherein the step of identifying configuration information further includes the step of identifying, based on said configuration information, at least one of a Universal Resource Indicator corresponding to said external network resource, and network credentials corresponding to said external network resource.

3. The method as claimed in claim 1, wherein identifying configuration information to be mapped onto said virtual address, further includes the step of identifying said configuration information only in an event said computer-based system is determined, based on corresponding pre-defined user credentials, to be authorized to access said external network resource.

4. A computer-implemented system comprising:
at least one processor,
at least one memory module storing executable computer program code, and communicably coupled to said processor, wherein said memory module and said executable program code are configured, with said processor, to cause said computer-implemented system to:
generate a first mapping that translates at least one virtual address into a local address assigned to at least one local resource, and render said virtual address usable on said computer-implemented system, based on said first mapping, for accessing said local resource;
in response to a request for using said virtual address to access an external network resource in addition to accessing said local resource, identify configuration information for rendering said external network resource accessible via said computer-implemented system;
process said configuration information, and determine, based on said configuration information, at least an external network resource address usable for accessing said external network resource; and
generate a second mapping, said second mapping being at least an updating of said first mapping, and configuring said second mapping to translate said virtual address into said external network resource address, wherein said processor configures said second mapping to translate said virtual address into said external network resource address, and to simultaneously translate said virtual address into a second local address distinct from said local address, and assigned to a second local resource, and wherein said processor selectively reconfigures said second mapping to translate said virtual address into a second external network resource address distinct from said external network resource address, and to simultaneously translate said virtual address into said second local address assigned to said second local resource.

5. The system as claimed in claim 4, wherein said processor is further configured to identify, based on said configuration information, at least one of said external network resource address, a Universal Resource Indicator corresponding to said external network resource, and network credentials corresponding to said external network resource.

6. The system as claimed in claim 4, wherein said processor identifies configuration information necessary for rendering said external network resource accessible via said first computer-implemented system, only in an event said computer-based system is determined, based on corresponding pre-defined user credentials, to be authorized to access said external network resource.

7. A non-transitory computer readable storage medium having computer readable program instructions stored thereupon, said computer readable program instructions, when read and executed by a processor installed within a computer-implemented system, cause said processor to:
generate a first mapping that translates at least one virtual address into a local address assigned to at least one local resource, and render said virtual address usable on said computer-implemented system, based on said first mapping, for accessing said local resource;
in response to a request for using said virtual address to access an external network resource in addition to accessing said local resource, identify configuration information for rendering said external network resource accessible via said first computer-implemented system;
process said configuration information, and determine, based on said configuration information, at least an external network resource address usable for accessing said external network resource; and
generate a second mapping, said second mapping being at least an updating of said first mapping, and configuring said second mapping to translate said virtual address into said external network resource address, wherein said processor configures said second mapping to translate said virtual address into said external network resource address, and to simultaneously translate said virtual address into a second local address distinct from said local address, and assigned to a second local resource, and wherein said processor selectively reconfigures said second mapping to translate said virtual address into a second external network resource address distinct from said external network resource address, and to simultaneously translate said virtual address into said second local address assigned to said second local resource.

8. The computer readable program instructions as claimed in claim 7, wherein said computer readable program instructions further cause the processor to:

identify, based on said configuration information, at least one of said external network resource address, a Universal Resource Indicator corresponding to said external network resource, and network credentials corresponding to said external network resource;

identify configuration information for rendering said external network resource accessible via said first computer-implemented system, only in an event said computer-based system is determined, based on corresponding pre-defined user credentials, to be authorized to access said external network resource.

\* \* \* \* \*